United States Patent
Yonezawa et al.

(10) Patent No.: US 9,733,426 B2
(45) Date of Patent: Aug. 15, 2017

(54) MULTIMODE OPTICAL FIBER

(71) Applicant: SUMITOMO ELECTRIC INDUSTRIES, LTD., Osaka-shi, Osaka (JP)

(72) Inventors: Kazuhiro Yonezawa, Yokohama (JP); Tadashi Enomoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/944,798

(22) Filed: Nov. 18, 2015

(65) Prior Publication Data

US 2017/0139130 A1    May 18, 2017

(51) Int. Cl.
  *G02B 6/02*   (2006.01)
  *G02B 6/028*  (2006.01)
  *G02B 6/036*  (2006.01)
  *C03C 13/04*  (2006.01)

(52) U.S. Cl.
  CPC .......... *G02B 6/0288* (2013.01); *C03C 13/046* (2013.01); *G02B 6/02214* (2013.01); *G02B 6/0365* (2013.01); *G02B 6/03627* (2013.01); *C03C 2213/00* (2013.01)

(58) Field of Classification Search
  USPC ................................................ 385/123–124
  See application file for complete search history.

(56) References Cited

U.S. PATENT DOCUMENTS

2005/0013570 A1\*  1/2005  Guan ................... G02B 6/0288
                                                            385/124
2013/0114934 A1    5/2013  Bookbinder et al.

OTHER PUBLICATIONS

A. Mutig, "High Speed VCSELs for Optical Interconnects," Springer, ISBN978-642-16569-6, 2011, Abstract only.
J. B. Heroux, et al., "Low Power Computer Interconnect with 1060nm VCSEL," Advanced Photonics Congress, 2012.
Hai-Feng Liu, "Integrated Silicon Photonics Links for High Bandwidth Data Transportation," Proc. OFC-2013 paper Th1D.1 2014, 2013.

\* cited by examiner

*Primary Examiner* — Eric Wong
(74) *Attorney, Agent, or Firm* — Drinker Biddle & Reath LLP

(57) ABSTRACT

The present invention relates to an MMF with a structure for relaxing wavelength dependence of transmission bandwidth. In the MMF, a doping amount of a dopant for control of refractive index is adjusted, so as to make each of an OFL bandwidth at a wavelength of 850 nm and an OFL bandwidth at a wavelength of at least one of 980 nm, 1060 nm, and 1300 nm become not less than 1500 MHz·km, make the OFL bandwidth at the wavelength of at least one of 980 nm, 1060 nm, and 1300 nm become wider than the OFL bandwidth at the wavelength of 850 nm, and effectively suppress increase in transmission loss.

7 Claims, 9 Drawing Sheets

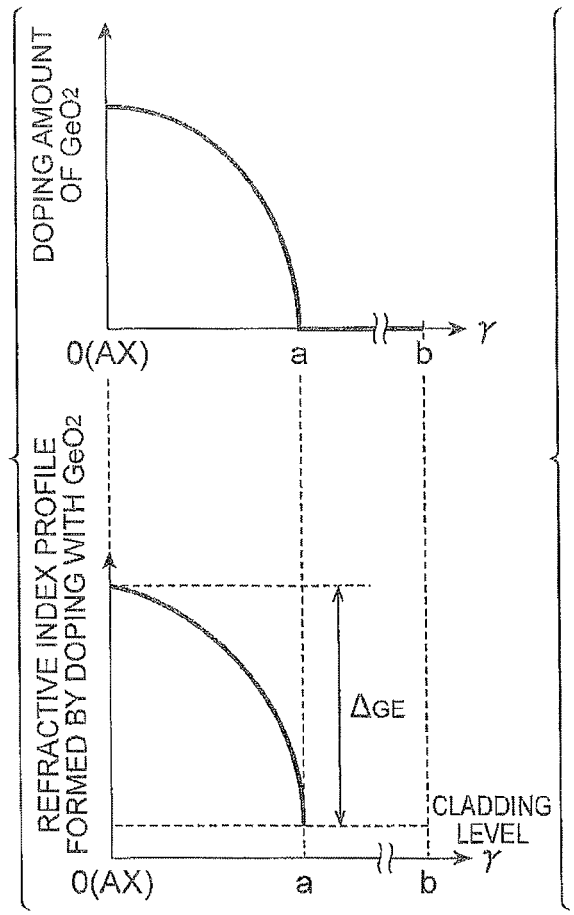
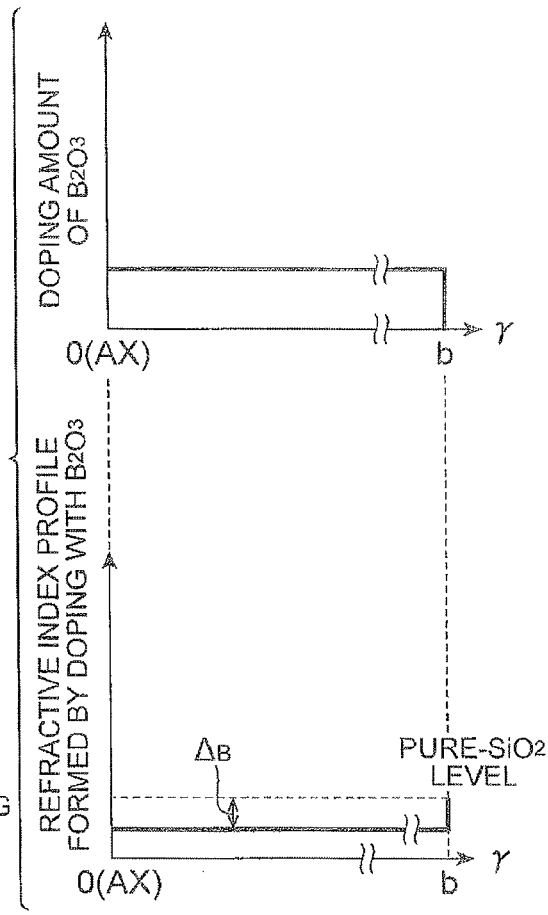
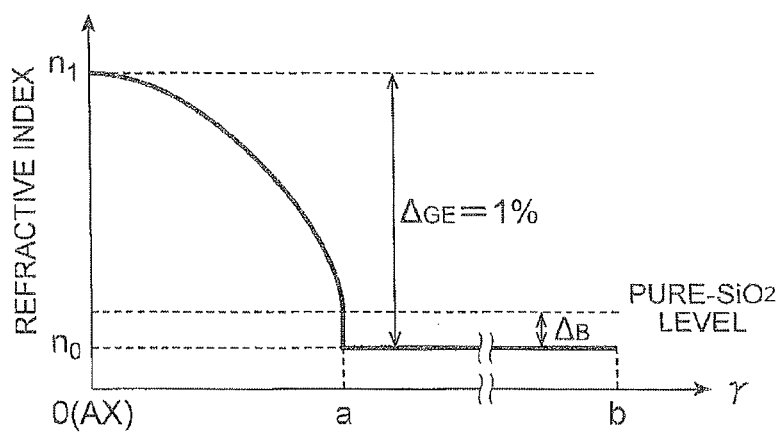

| WAVELENGTH | OFL BANDWIDTH (GHz·km) | |
|---|---|---|
| | COMPARATIVE EXAMPLE | EMBODIMENT |
| 0.85 μm | 1.13 | 1.64 |
| 0.98 μm | 15.4 | 16.6 |
| 1.06 μm | 2.32 | 2.84 |
| 1.30 μm | 0.674 | 0.706 |

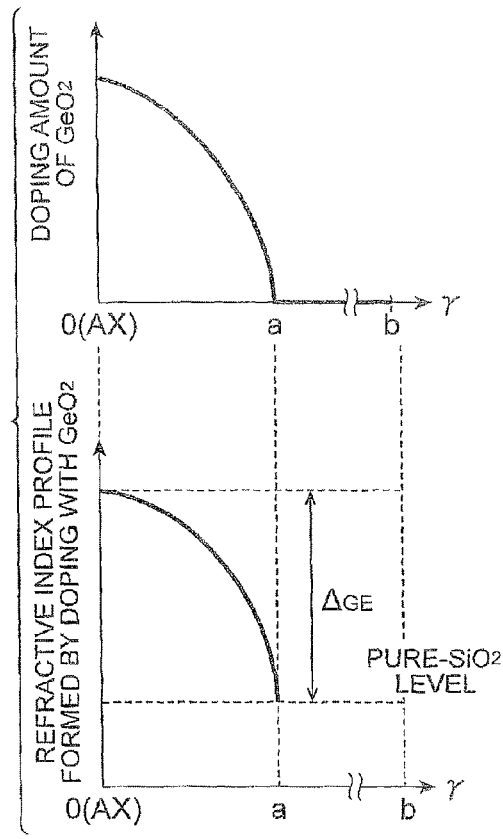
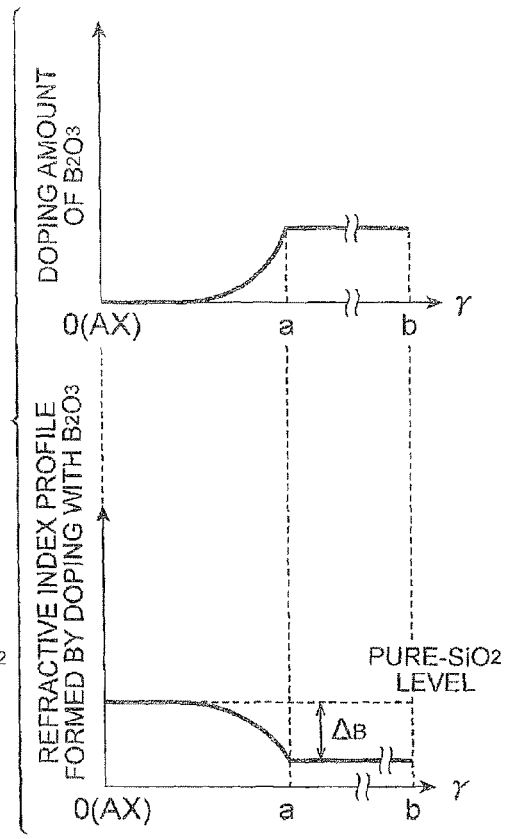
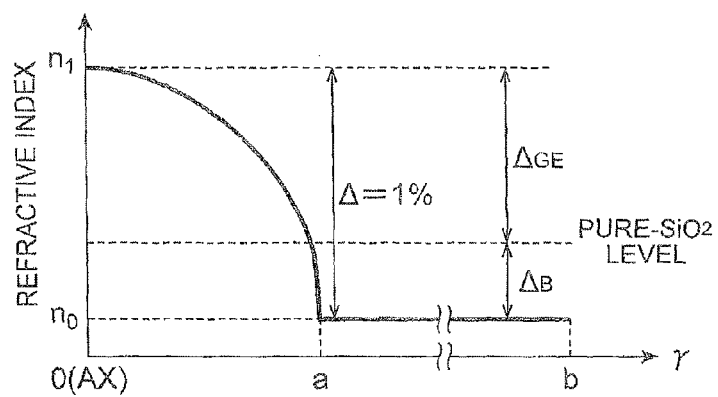

MULTIMODE OPTICAL FIBER

BACKGROUND OF THE INVENTION

Field of the Invention

The present invention relates to a multimode optical fiber (hereinafter referred to as MMF: MultiMode optical Fiber).

Related Background Art

The known transmission systems to which the existing MMFs are applied include transmission systems mainly using an 850-nm VCSEL (Vertical Cavity Surface Emitting Laser) as a light source. The A1a.2 (OM3) and A1a.3 (OM4) silica-based MMFs are defined in the below-described International Standards. Specifically, for these silica-based MMFs, a value of transmission bandwidth in the 850-nm transmission wavelength band is defined as a standard and this value of OFL bandwidth is a major parameter to determine transmission characteristics of the MMFs.

Furthermore, active research has been conducted on speed-up of the transmission systems constructed by the combination of MMF with VCSEL as a light source as described above. As light sources that can operate faster than the 850-nm VCSEL, for example, Mutig, "High Speed VCSELs for Optical Interconnects," Springer, 2011 (First Literature) introduces the 980-nm VCSEL and, for example, Heroux and S. Nakagawa, "Low Power Computer Interconnect with 1060 nm VCSEL," IPRSN (Integrated Photonics Research, Silics and Nanophotonics) conference paper 2012-IM3A.2 (Second Literature) introduces the 1060-nm VCSEL. It is considered, therefore, that, as future light sources of the transmission systems needed to implement faster transmission in communication in data centers, the 850-nm VCSEL will be replaced by the 980-nm VCSEL or the 1060-nm VCSEL.

In addition, for example, Hai-Feng Liu, "Integrated Silicon Photonics Links for High Bandwidth Data Transportation," Proc. OFC-2013 paper Th1D.1 2014 (Third Literature) also reports the research on interconnections in data centers by combination of the MMF with a silicon photonics light source that oscillates near the wavelength of 1300 nm.

SUMMARY OF THE INVENTION

The Inventors conducted research on the conventional MMFs which have been applied heretofore to the foregoing transmission systems, and found the problem as described below.

Specifically, the conventional MMFs are designed to have small inter-modal dispersion and realize a wider transmission bandwidth when used in combination with the 850-nm VCSEL as a light source. If such conventional MMFs are used to perform transmission in the 980-nm band, 1060-nm band, or 1300-nm band, the inter-modal dispersion will become larger and, as a result, the transmission bandwidth in the transmission wavelength band may become narrower. If such a conventional MMF is applied to WDM (Wavelength Division Multiplexing) transmission, which enables simultaneous transmission at a plurality of wavelengths, it may result in failure in achieving desired transmission characteristics because the applied MMF has nonoptimal chromatic dispersion, transmission loss, inter-modal dispersion, etc. at each of wavelengths.

In general, in the case of an MMF in which a refractive index profile in its core is a GI (Graded Index) refractive index profile (hereinafter referred to as GI-MMT), the core is provided with the refractive index profile called an α-power profile, for suppressing the inter-modal dispersion, and it is known that an α value to minimize the inter-modal dispersion (hereinafter referred to as $\alpha_{opt}$) varies depending upon the Sellmeier coefficients of a material making up the MMF and upon wavelengths, as described below. Each of the inter-modal dispersion and transmission bandwidth of the MMF given the α-value has wavelength dependence and, in a general GI-MMF (which is manufactured by doping the core consisting primarily of $SiO_2$ with $GeO_2$), the wavelength dependence of $\alpha_{opt}$, and the transmission bandwidth is significant. On the other hand, if the cladding material is changed or if the core is doped with multiple kinds of elements, it may result in increase in transmission loss of the optical fiber and/or significant degradation of characteristics other than the transmission bandwidth, e.g., chromatic dispersion; therefore, it is necessary to pay attention to these various characteristics.

Therefore, if we can relax the wavelength dependence of the transmission characteristics in the MMF, an OFL bandwidth (Over Filled Launch Bandwidth) wide enough for use must also be maintained as a transmission bandwidth, for example. This means that it becomes easier to manufacture the MMFs satisfying the OM3 (A1a.2) and OM4 (A1a.3) Standards of ISO/IEC11801, which are suitable for fast transmission.

In passing, the MMF satisfying the OM3 Standard refers to a fiber that has the bandwidth called Effective Modal Bandwidth (EMB), of not less than 2000 MHz·km and the bandwidths in all-mode excitation (OFL bandwidths defined by International Standards IEC60793-1-41), of not less than 1500 MHz·km at 850 nm and not less than 500 MHz·km at 1300 nm.

(OM3-1) EMB (850 nm)≥2000 MHz·km
(OM3-2) OFL bandwidth (850 nm)≥1500 MHz·km
(OM3-3) OFL bandwidth (1300 nm)≥500 MHz·km In the OM4 Standard, the MMF needs to satisfy the three conditions (OM4-1 to OM4-3) below.

(OM4-1) EMB (850 nm)≥4700 MHz·km
(OM4-2) OFL bandwidth (850 nm)≥3500 MHz·km
(OM4-3) OFL bandwidth (1300 nm)≥500 MHz·km The present invention has been accomplished in order to solve the problem as described above and it is an object of the present invention to provide an MMF with a structure for relaxing the wavelength dependence of the transmission bandwidth while effectively suppressing the increase in transmission loss.

An MMF according to an embodiment of the present invention has a core extending along a predetermined axis, and a cladding provided on an outer peripheral surface of the core. Particularly, when a first condition is defined as a condition that an OFL bandwidth at a wavelength of 850 nm is not less than 1500 MHz·km and an OFL bandwidth at a wavelength of at least one of 980 nm, 1060 nm, and 1300 nm is not less than 1500 MHz·km and when a second condition is defined as a condition that the OFL bandwidth at the wavelength of at least one of 980 nm, 1060 nm, and 1300 nm is wider than the OFL bandwidth at the wavelength of 850 nm, a doping amount of a dopant for control of refractive index in a region corresponding to at least either of the core and the cladding, in a refractive index profile of the MMF is adjusted so as to satisfy both of the first condition and the second condition. In a wavelength range of 850 nm to 1300 nm, the MMF according to the embodiment of the invention has transmission loss of not more than 4.0 dB/km.

Concerning the light sources of the transmission systems to which the conventional MMFs are applied, the light sources are expected to switch from the 850-nm VCSEL to the 980-nm VCSEL, the 1060-nm VCSEL, or the 1300-nm silicon photonics light source, as described above. Even with such speed-up movement of the transmission systems, the embodiment of the invention allows upgrades of the existing transmission systems, without need for replacement of the conventional MMFs with a new MMF optimized for each operation wavelength, because it has achieved relaxation of the wavelength dependence of the OFL bandwidth as a transmission bandwidth. On the assumption of the WDM transmission, if the MMF applied is one wherein the transmission bandwidth on the longer wavelength side is wider than that at 850 nm, it can derive transmission characteristics enough for use of the WDM transmission system, on the longer wavelength side.

Each of embodiments according to the present invention will become more fully understood from the detailed description given hereinbelow and the accompanying drawings. These embodiments are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

BRIEF DESCRIPTION OF THE DRAWINGS

FIG. 5A is a drawing showing a doping amount change along the radial direction of the MMF, of $GeO_2$ added in the core of the MMF according to the first embodiment (GI MMF having the GI refractive index profile), and a refractive index profile formed by doping with $GeO_2$, FIG. 5B a drawing showing a doping amount change along the radial direction of the MMF of $B_2O_3$ added in both of the core and cladding of the MMF according to the first embodiment (GI MMF having the GI refractive index profile), and a refractive index profile formed by doping with $B_2O_3$, and FIG. 5C a refractive index profile along the radial direction of the MMF, of the MMF of the first embodiment.

FIG. 7A is a drawing showing a doping amount change along the radial direction of the MMF, of $GeO_2$ added in the core of the MMF according to the second embodiment (GI MMF having the GI refractive index profile), and a refractive index profile formed by doping with $GeO_2$, FIG. 7B a drawing showing a doping amount change along the radial direction of the MMF, of $B_2O_3$ added in both of the core and cladding of the MMF according to the second embodiment (GI MMF having the GI refractive index profile), and a refractive index profile formed by doping with $B_2O_3$, and FIG. 7C a refractive index profile along the radial direction of the MMF, of the MMF of the second embodiment.

DESCRIPTION OF EMBODIMENTS

Description of Embodiment of Present Invention

Figure 1A:
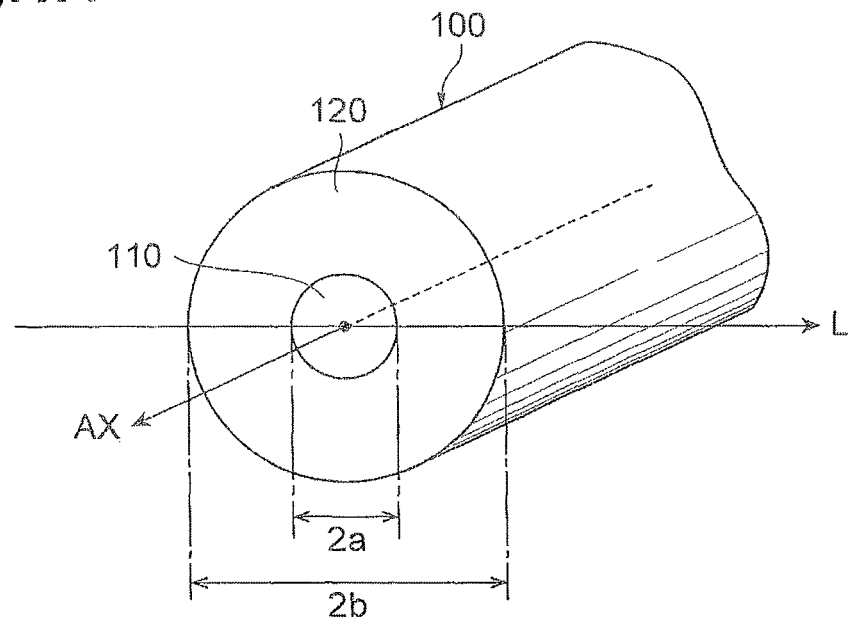
FIG. 1A is a cross section showing an example of the structure of the MMF according to the embodiment of the invention and FIG. 1B an example of its refractive index profile (GI refractive index profile).

An MMF according to the present invention has a core extending along a predetermined axis, and a cladding provided on an outer peripheral surface of the core.

(1) As a first aspect, when a first condition is defined as a condition that an OFL bandwidth at a wavelength of 850 nm is not less than 1500 MHz·km and an OFL bandwidth at a wavelength of at least one of 980 nm, 1060 nm, and 1300 nm is not less than 1500 MHz·km and when a second condition is defined as a condition that the OFL bandwidth at the wavelength of at least one of 980 nm, 1060 nm, and 1300 nm is wider than the OFL bandwidth at the wavelength of 850 nm, a doping amount of a dopant for control of refractive index in a region corresponding to at least either of the core and the cladding, in the MMF is adjusted so as to satisfy both of the first condition and the second condition. Transmission loss in a wavelength range of 850 nm to 1300 nm is not more than 4.0 dB/km. In this case, it becomes feasible to achieve upgrades of the existing transmission systems, without need for replacement of the conventional MMFs with the MMF optimized for each operation wavelength, because the MMF of the first aspect achieves the relaxation of the wavelength dependence of the OFL bandwidth as a transmission bandwidth. On the assumption of the WDM transmission, if the MMF applied is one wherein the transmission bandwidth on the longer wavelength side is wider than that at 850 nm, it can derive the transmission characteristics enough for use of the WDM transmission system, on the longer wavelength side.

(2) As a second aspect applicable to the first aspect, the cladding may be comprised of silica glass doped with the dopant for control of refractive index, or, a material other than the silica glass.

(3) As a third aspect applicable to at least either one of the first and second aspects, the core may have a GI refractive index profile. In this case, the GI refractive index profile may be formed by doping the core with a plurality of dopants different from each other, as the dopant for control of refractive index.

(4) As a fourth aspect applicable to at least any one of the first to third aspects, each of the plurality of dopants for control of refractive index preferably contains any one of $GeO_2$, $P_2O_5$, $B_2O_3$, F, and Cl.

(5) As a fifth aspect applicable to at least any one of the first to fourth aspects, the MMF preferably has chromatic dispersion falling within the range of −100 to +100 ps/nm/km, in the wavelength range of 850 nm to 1300 nm. The WDM transmission can be one of candidates as means for realizing an increase in capacity of short-haul transmission. In this case, if chromatic dispersion occurs at each of communication wavelengths, it will lead to degradation of transmission quality. Therefore, it is preferred that the chromatic dispersion should fall within the foregoing range, in the wavelength range of 850 nm to 1300 nm which is expected to be used in future.

(6) As a sixth aspect applicable to at least any one of the first to fifth aspects, the MMF preferably has the transmission loss of not more than 2.7 dB/km and more preferably has the transmission loss of not more than 2.4 dB/km, in the wavelength range of 850 nm to 1300 nm.

(7) As a seventh aspect applicable to at least any one of the first to sixth aspects, the core and the cladding both are preferably doped with a common refractive-index decrease agent, as the dopant for control of refractive index. Furthermore, preferably, in a cross section of the multimode optical fiber perpendicular to the predetermined axis, a doping amount of the common refractive-index decrease agent in the core monotonically increases along a radial direction from a center of the core.

(8) As an eighth aspect applicable to at least any one of the first to seventh aspects, the dopant for control of refractive index includes a refractive-index increase agent and a refractive-index decrease agent. In this case, preferably, the core is doped with $GeO_2$ as the refractive-index increase agent and both of the core and the cladding are doped with $B_2O_3$ as the refractive-index decrease agent. Furthermore, preferably, in the cross section of the multimode optical fiber perpendicular to the predetermined axis, a doping amount of the refractive-index increase agent in the core monotonically decreases along the radial direction from the center of the core, in order to obtain a refractive index profile of a predetermined shape.

(9) As a ninth aspect applicable to at least any one of the first to eighth aspects, the dopant for control of refractive index includes a refractive-index increase agent and a refractive-index decrease agent. In this case, preferably, the core is doped with $GeO_2$ as the refractive-index increase agent and both of the core and the cladding are doped with $B_2O_3$ as the refractive-index decrease agent. Furthermore, preferably, in the cross section of the multimode optical fiber perpendicular to the predetermined axis, a doping amount of the refractive-index decrease agent in the core monotonically increases along the radial direction from the center of the core, in order to obtain a refractive index profile of a predetermined shape. Particularly, when the core is doped with the refractive-index increase agent and the refractive-index decrease agent as the dopant for control of refractive index, a sufficient maximum relative refractive index difference Δ can be obtained without increase in respective doping amounts of the refractive-index increase agent and the refractive-index decrease agent and thus degradation of transmission characteristics in the MMF other than the transmission bandwidth, such as the chromatic dispersion and the transmission loss, can also be effectively suppressed.

Details of Embodiments of Present Invention

Each of embodiments of the present invention will be described below in detail with reference to the accompanying drawings. In the description of the drawings, the same portions and the same elements will be denoted by the same reference signs, without redundant description. It should be noted that the present invention is by no means intended to be limited to these examples presented by way of illustration but is intended for inclusion of all changes within the meaning and scope of equivalence to the scope of claims, as described in the scope of claims.

Figure 1B:
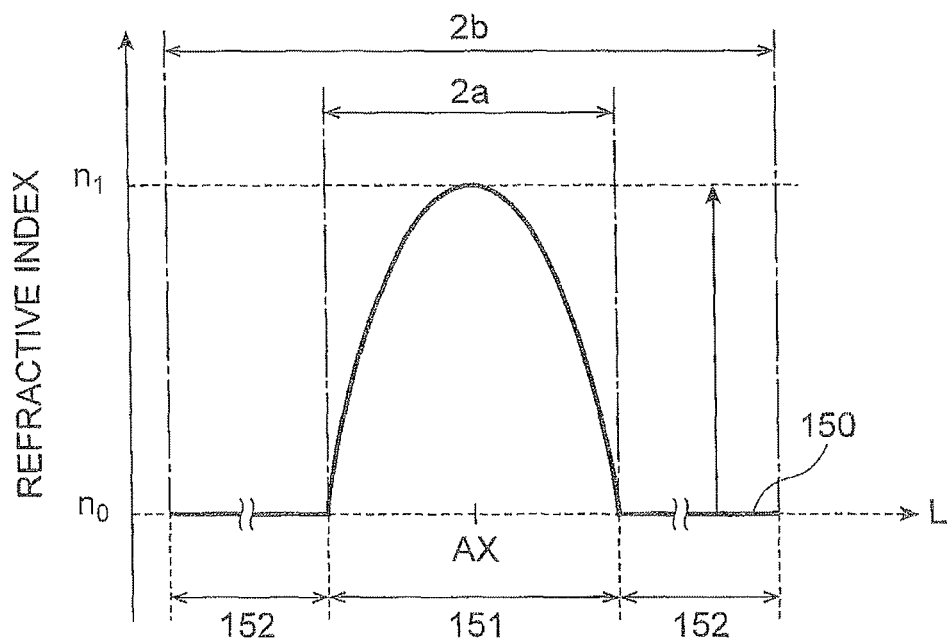

FIG. 1A is a cross section showing an example of the structure of the MMF according to the embodiment of the invention and FIG. 1B an example of its refractive index profile (GI refractive index profile). The MMF with the core having the GI refractive index profile as shown in FIG. 1B will be referred to hereinafter as GI-MMF.

The GI-MMF 100, as shown in FIG. 1A, has a core 110 extending along an optical axis AX, and a cladding 120 provided on the outer periphery of the core 110. In this GI-MMF 100, at least one of the core 110 and the cladding 120 is doped with one or more dopants for control of refractive index (each dopant for control of refractive index will be referred to hereinafter as an index-control dopant). The core 110 has the diameter 2a and has a maximum refractive index $n_1$ at its center (position intersecting with the optical axis AX). The cladding 120 has the diameter 2b. The cladding 120 is comprised of pure silica glass, silica glass doped with an index-control dopant, or a material other than the glass materials, and has a refractive index $n_0$ ($<n_1$).

The refractive index profile 150 of the GI-MMF 100, which is shown in FIG. 1B, indicates refractive indices of respective parts on a line L perpendicular to the optical axis AX (the line L coincides with a radial direction of the GI-MMF 100) and, more specifically, region 151 indicates refractive indices of respective parts of the core 110 along the line L, and region 152 refractive indices of respective parts of the cladding 120 along the line L.

Particularly, the refractive index profile 150 of FIG. 1B has a refractive index profile n(r) expressed by Formula (1) below. The core 110 corresponding to the region 151 has the refractive index n(r) in a dome shape in which the refractive index is maximum at the center of the core 110 coincident with the optical axis AX (or at a position where the optical axis AX intersects with the cross section of the GI-MMF 100) (which is an α-power refractive index profile). The refractive index n(r) of the core 110 defined in the range of 0≤r≤a represents the refractive index of the core 110 with the radius a (the diameter 2a) and refractive index at a position distant by r in the radial direction from the center of the core 110. Therefore, when the core 110 is doped with a refractive-index increase agent such as $GeO_2$, $P_2O_5$, or Cl as an index-control dopant, a concentration of the foregoing refractive-index increase agent as exemplified sharply decreases from the center of the core 110 toward the cladding 120 (or monotonically decreases). Inversely, when the core 110 is doped with a refractive-index decrease agent such as $B_2O_3$ or F as an index-control dopant, a concentration of the refractive-index decrease agent sharply increases from the center of the core 110 toward the cladding 120 (or monotonically increases). The α value to define this dome shape is from 1.8 to 2.2. A maximum relative refractive index difference Δ between the core 110 and the cladding 120 (which corresponds to a relative refractive index difference between the refractive index of the cladding 120 and the maximum refractive index at the center of the core 110) is from 0.8 to 2.4%. The diameter of the core 110 is from 25 to 65 μm. In the present specification, the structure of the core in the embodiments, comparative example, and others described below is the same as the above-described structure of the core. The maximum relative refractive index difference Δ between the cladding 120 (ref active index $n_0$) and the core 110 (maximum refractive index $n_1$) is defined by Formula (2) below. The below definition of the relative refractive index difference is also applied to the other embodiments.

$$n(r) = \begin{cases} n_1\left(1 - 2\Delta\left(\frac{r}{n}\right)^\alpha\right)^{\frac{1}{2}} & (0 \leq r \leq a) \\ n_0 & (a < r) \end{cases} \quad (1)$$

$$\Delta = \frac{|n_1^2 - n_0^2|}{2n_1^2} \quad (2)$$

In the above formulae, Δ represents the maximum relative refractive index difference of the core relative to the cladding, $n_1$ the refractive index at the core center (maximum refractive index), $n_0$ the refractive index of the cladding, r the distance from the core center, a the radius of the core, and α the power to determine the shape of the α profile.

By use of the WKB approximation (Wentzel-Kramers-Brillouin approximation), the α value to minimize the inter-modal dispersion of the MMF ($\alpha_{opt}$) is expressed by Formula (3) below. The parameter y in Formula (3) is an amount indicative of wavelength dependence of the maximum relative refractive index difference Δ, which is called Olshansky parameter, and is defined by Formula (4) below.

$$\alpha_{opt} = 2 + y - \Delta\frac{(4+y)(3+y)}{(5+2y)} \quad (3)$$

$$y = -2\frac{n_1}{N_1} \cdot \frac{\lambda}{\Delta} \cdot \frac{d\Delta}{d\lambda} \quad (4)$$

In the above formula, $N_1$ represents the group index of the core and λ the transmission wavelength in vacuum.

Figure 2A:
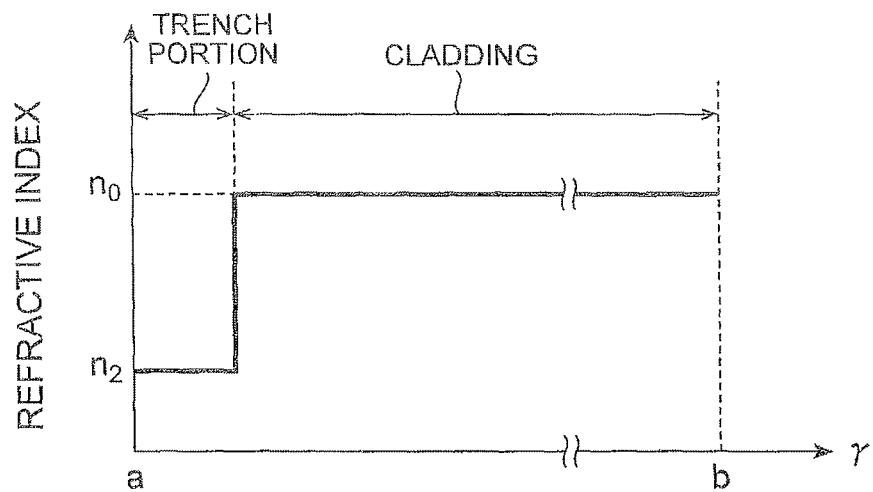
FIG. 2A and FIG. 2B are examples of refractive index profiles of sectional structures applicable to a peripheral region around the core in the MMF shown in FIG. 1A.
Figure 2B:
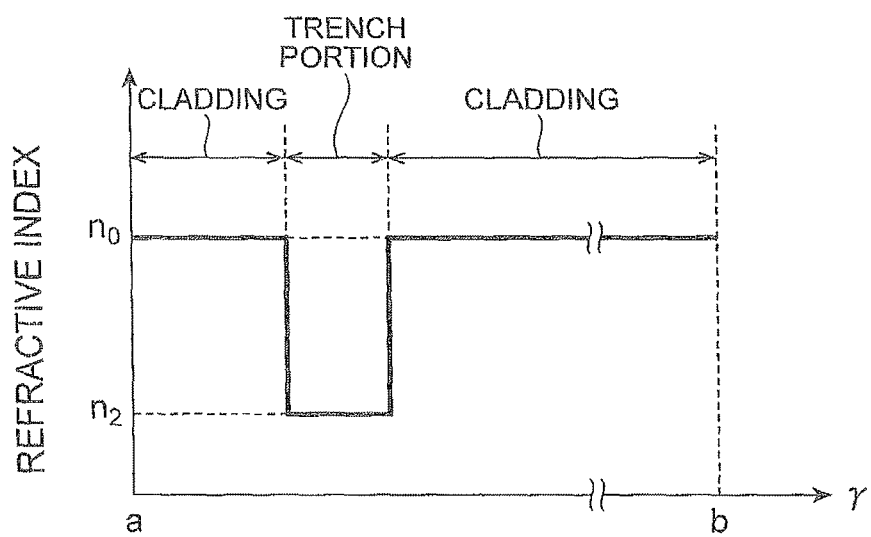

A trench portion having a refractive index $n_2$ lower than the refractive index $n_0$ of the cladding 120 may be provided around the core 110. FIGS. 2A and 2B are examples of refractive index profiles of sectional structures applicable to the peripheral portion around the core in the MMF shown in FIG. 1A. Namely, the trench portion may be provided between the core and the cladding, as shown in FIG. 2A. The trench portion may also be provided in the cladding as separated by a predetermined distance from the core, as shown in FIG. 2B. In this example of FIG. 2B, there is a part of the cladding located between the core and the trench portion. A relative refractive index difference $\Delta_{trench}$ between the trench portion and the cladding is obtained by replacing the refractive index $n_1$ in the foregoing Formula (2) with $n_2$.

In the MMF having any one of the above-described sectional structures and refractive index profiles, as is considered to be applied to a transmission system for implementation of WDM transmission, its chromatic dispersion preferably falls within the range of −100 to +100 ps/nm/km, in the wavelength range of 850 nm to 1300 nm. The MMF of the present embodiment includes a mode of doping with multiple kinds of index-control dopants. For high-speed extended distance transmission of a signal, the fiber is desired to have all of the transmission loss, chromatic dispersion, and bandwidth at good levels. For example, even if the bandwidth is good but if the transmission loss is high, the signal will fail to propagate; if the chromatic dispersion is large, the signal waveform will degrade. For this reason, it is desirable to prevent the signal from being degraded by any other cause, while maintaining the bandwidth.

(Wavelength Dependence of OFL Bandwidth)

Next, the relaxation of the wavelength dependence of the OFL bandwidth in the MMF of the present embodiment will be described below using a comparative example.

Figure 3A:
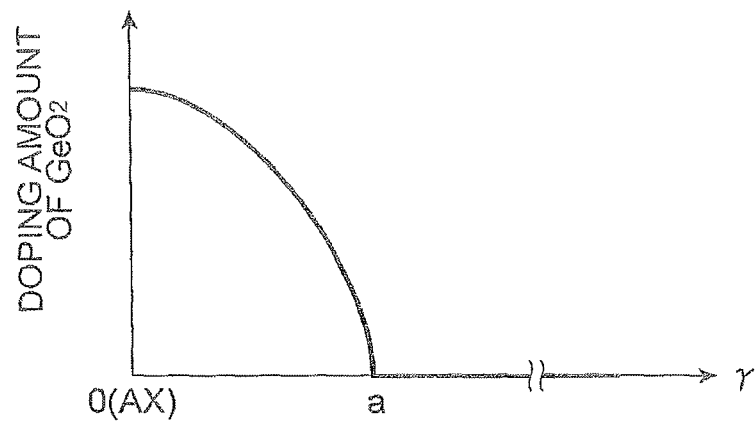
FIG. 3A is a drawing showing a doping amount change along the radial direction of the MMF, of $GeO_2$ added in the core of an MMF as a comparative example (GI MMF having a GI refractive index profile), FIG. 3B a refractive index profile formed by doping with $GeO_2$, and FIG. 3C a refractive index profile along the radial direction of the MMF, of the MMF according to the comparative example.
Figure 3B:
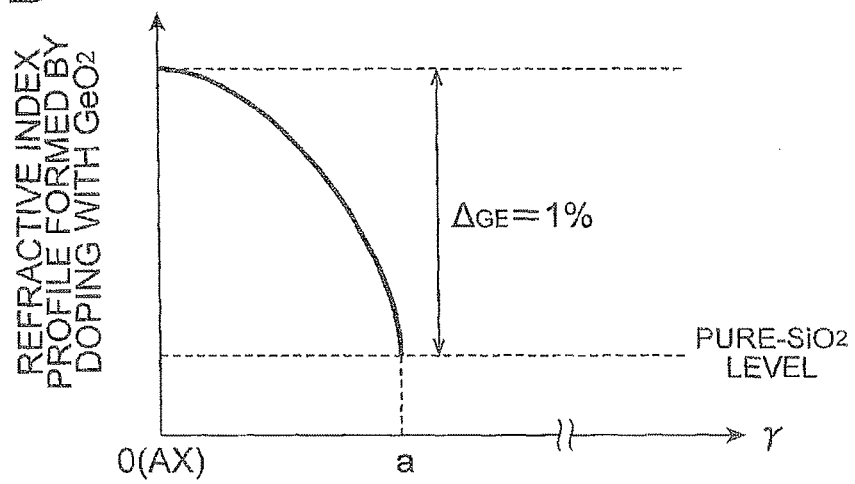
Figure 3C:
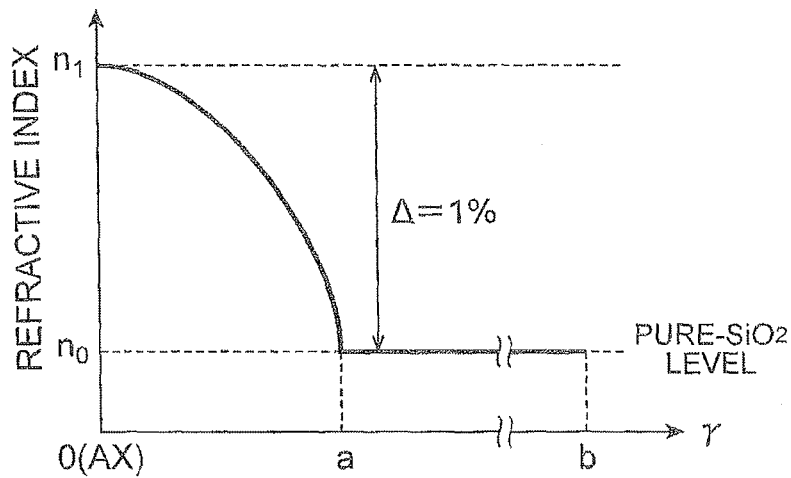

First, FIG. 3A is a drawing showing a doping amount change along the radial direction of the MMF, of $GeO_2$ added in the core of the MMF according to the comparative example (GI MMF having a GI refractive index profile), FIG. 3B a refractive index profile formed by doping with $GeO_2$, and FIG. 3C a refractive index profile along the radial direction of the MMF, of the MMF according to the comparative example.

The MMF of the comparative example is a GI-MMF having the same sectional structure as the sectional structure shown in FIG. 1A, which has the core extending along the optical axis AX, and the cladding provided on the outer peripheral surface of the core. The outer diameter of the core (the diameter 2a) is 50 μm and the outer diameter of the cladding is 125 μm. The core is doped with $GeO_2$ as an index-control dopant and a doping amount of $GeO_2$ is set, as shown in. FIG. 3A, so that the doping amount monotonically decreases along the radial direction from the core center (position coincident with the optical axis AX in the cross section of the core). FIG. 3B shows the refractive index profile formed by doping with $GeO_2$ and a relative refractive index difference $\Delta_{GE}$ resulting from $GeO_2$ is 1%. On the other hand, since the cladding is comprised of pure $SiO_2$, a resultant overall refractive index profile of the MMF according to this comparative example is a GI refractive index profile of the shape shown in FIG. 3C. In the GI refractive index profile of FIG. 3C, the maximum relative refractive index difference Δ between the core and cladding is equal to the relative refractive index difference $\Delta_{GE}$ resulting from $GeO_2$. It is noted herein that $\Delta_{GE}$ is given by setting $n_1$ in the foregoing Formula (2) to the maximum refractive index at the core center and setting $n_0$ to the refractive index of pure $SiO_2$.

Figure 4A:
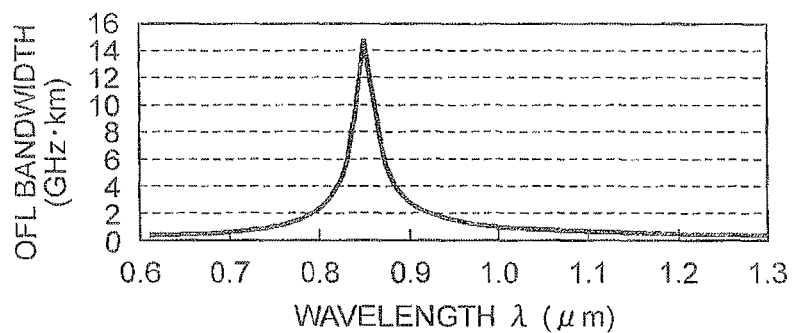
FIG. 4A to FIG. 4D are drawings showing wavelength characteristics of OFL bandwidths in MMFs of the comparative example.
Figure 4B:
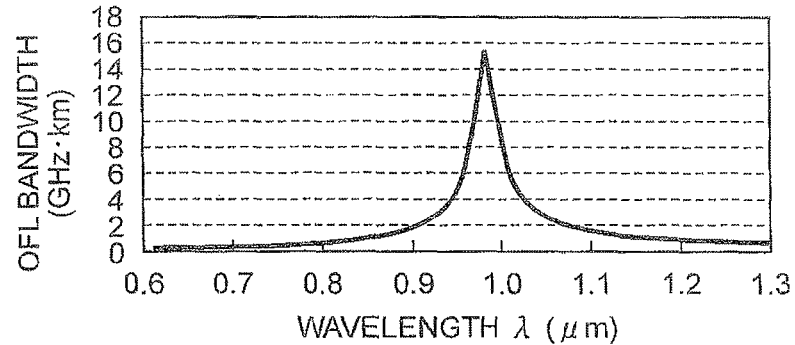
Figure 4C:
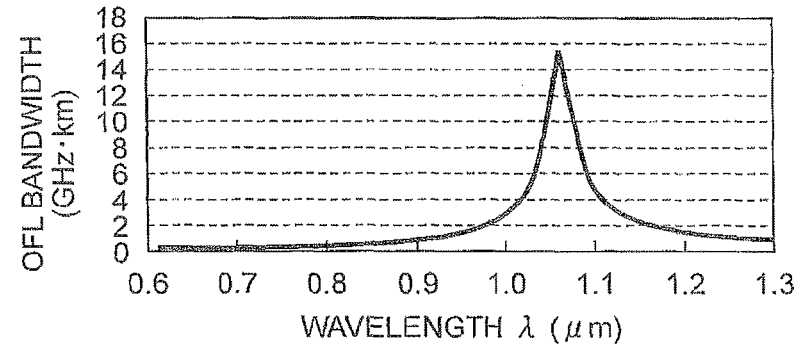
Figure 4D:
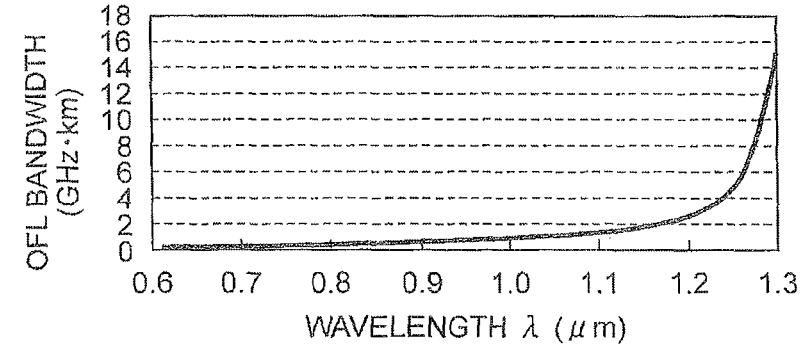

Wavelength characteristics of the OFL bandwidths in MMFs having the structure as described above are shown in FIGS. 4A to 4D. The wavelength characteristic shown in FIG. 4A is expressed by a relationship between OFL bandwidth and wavelength in the MMF where the α value to define the shape of the GI refractive index profile in the core is adjusted to $\alpha_{opt}$ at the wavelength of 0.85 μm (α value with which the inter-modal dispersion becomes minimum at the wavelength of 0.85 μm). The wavelength characteristic shown in FIG. 4B is expressed by a relationship between OFL bandwidth and wavelength in the MMF where the α value to define the shape of the GI refractive index profile in the core is adjusted to $\alpha_{opt}$ at the wavelength of 0.98 μm. The wavelength characteristic shown in FIG. 4C is expressed by a relationship between OFL bandwidth and wavelength in the MMF where the α value to define the shape of the GI refractive index profile in the core is adjusted to $\alpha_{opt}$ at the wavelength of 1.06 μm. The wavelength characteristic shown in FIG. 4D is expressed by a relationship between OFL bandwidth and wavelength in the MMF where the α value to define the shape of the GI refractive index profile in the core is adjusted to $\alpha_{opt}$ at the wavelength of 1.30 μm.

As seen from these FIGS. 4A to 4D, the OFL bandwidth becomes sharply narrower at wavelengths off the designed wavelength. Namely, it is understood that the MMFs of the comparative example cannot secure a wide OFL bandwidth, in a wide wavelength range. In the MMF adjusted so that the bandwidth is good at 0.85 µm, the bandwidth does not reach 1500 MHz·km at any wavelength of 0.98 µm, 1.06 µm, and 1.30 µm. It is also understood that in the MMF adjusted so that the bandwidth is good at any wavelength of 0.98 µm, 1.06 µm, and 1.30 µm, the bandwidth at the wavelength of 0.85 µm does not reach 1500 MHz·km. As described above, it is difficult to obtain an MMF which can secure the bandwidth characteristic of 1500 MHz·km in the current transmission systems (0.85 µm) and which can also secure the bandwidth characteristic of 1500 MHz·km in future transmission systems (systems using at least any one wavelength of 0.98 µm, 1.06 µm, and 1.30 µm), by simple doping with $GeO_2$ as a dopant.

First Embodiment

In contrast to it, FIGS. 5A to 5C show the configuration of the MMF according to the first embodiment. This MMF of the first embodiment is a GI-MMF having the same sectional structure as the sectional structure shown in FIG. 1A, which has the core extending along the optical axis AX, and the cladding provided on the outer peripheral surface of the core. The outer diameter of the core (the diameter 2a) is 50 µm and the outer diameter of the cladding 125 µm.

The core is doped with $GeO_2$ as an index-control dopant and the doping amount of $GeO_2$ is set, as shown in FIG. 5A, so that the doping amount monotonically decreases along the radial direction from the core center (position coincident with the optical axis AX in the cross section of the core). In the refractive index profile formed by doping with $GeO_2$, which is shown in FIG. 5A, the relative refractive index difference $\Delta_{GE}$ resulting from $GeO_2$ is given by setting $n_1$ in above Formula (2) to the maximum refractive index at the core center and setting $n_0$ to the refractive index of the cladding. On the other hand, the core and cladding are doped with $B_2O_3$ as an index-control dopant, uniformly in the radial direction. In the refractive index profile formed by doping with $B_2O_3$, which is shown in FIG. 5B, the relative refractive index difference $\Delta_B$ resulting from $B_2O_3$ is given by setting $n_1$ in above Formula (2) to the refractive index of $SiO_2$ doped with $B_2O_3$ and setting $n_0$ to the refractive index of pure $SiO_2$.

When the predetermined regions are doped with one or more of the multiple kinds of index-control dopants as described above, the GI refractive index profile is obtained as the overall refractive index profile of the MMF of this first embodiment, as shown in the refractive index diagram FIG. 5C. In the GI refractive index profile of FIG. 5C, the maximum relative refractive index difference $\Delta$ between the core and cladding is constituted of the relative refractive index difference $\Delta_{GE}$ resulting from $GeO_2$ ($\Delta=1\%=\Delta_{GE}$) and thus the maximum relative refractive index difference $\Delta$ of 1% is ensured as a whole of the GI refractive index profile.

Figures 6A, 6B:
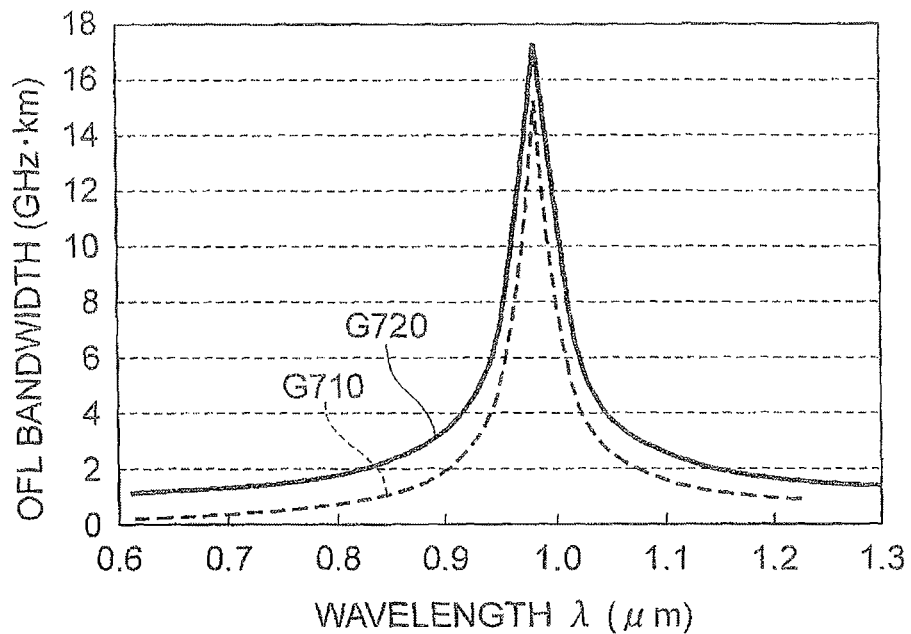
FIG. 6A is a drawing showing respective wavelength characteristics of OFL bandwidths in the MMF of the comparative example and the MMF of the first embodiment and FIG. 6B a table as a list of relationships between OFL bandwidth and wavelength shown in FIG. 6A.

FIG. 6A shows a wavelength characteristic (graph G710) of the OFL bandwidth in the MMF of the comparative example and a wavelength characteristic (graph G720) of the OFL bandwidth in the MMF of the first embodiment, which are configured as described above. FIG. 6B is a table as a list of the relationships between OFL bandwidth and wavelength shown in FIG. 6A.

In the examples of graphs G710 and G720 shown in FIG. 6A, the comparative example and the first embodiment both are represented by respective relationships between OFL bandwidth and wavelength in the MMFs where the α value to define the shape of the GI refractive index profile in the core is adjusted to $\alpha_{opt}$ at the wavelength of 0.98 µm. It is seen from FIGS. 6A and 6B that at all wavelengths, the OFL bandwidth of the first embodiment is wider than the OFL bandwidth of the comparative example. For example, at the wavelength of 0.85 µm, the OFL bandwidth of the first embodiment is not less than 1.5 GHz·km, whereas the OFL bandwidth of the comparative example is not more than 1.5 GHz·km. As described above, it is understood that the MMF of the first embodiment ensures the wide OFL bandwidth in the wider wavelength range than the MMF of the comparative example does.

Second Embodiment

Next, the structure of the MMF according to the second embodiment will be described using FIGS. 7A-7C, FIG. 8, and FIGS. 9A and 9B. This MMF of the second embodiment is also a GI-MMF having the same sectional structure as the sectional structure shown in FIG. 1A, which has the core extending the optical axis AX, and the cladding provided on the outer peripheral surface of the core. The outer diameter of the core (the diameter 2a) is 50 µm and the outer diameter of the cladding 125 µm. In this second embodiment, the core is doped with $GeO_2$ as a refractive-index increase agent and the core and cladding are doped with $B_2O_3$ as a refractive-index decrease agent.

The doping amount of $GeO_2$ in the core is set, as shown in FIG. 7A, so that the doping amount monotonically decreases along the radial direction from the core center (position coincident with the optical axis AX in the cross section of the core). In the refractive index profile formed by doping with $GeO_2$, which is shown in FIG. 7A, the relative refractive index difference $\Delta_{GE}$ resulting from $GeO_2$ is given by setting $n_1$ in above Formula (2) to the maximum refractive index at the core center and setting $n_0$ to the refractive index of pure $SiO_2$. On the other hand, the doping amount of $B_2O_3$ in the core is set, as shown in FIG. 7B, so that the doping amount monotonically increases along the radial direction from the core center (position coincident with the optical axis AX in the cross section of the core). As shown in FIG. 7B, the cladding is doped with $B_2O_3$, uniformly along the radial direction. In the refractive index profile formed by doping with $B_2O_3$, which is shown in FIG. 7B, the relative refractive index difference $\Delta_B$ resulting from $B_2O_3$ is given by setting $n_1$ in above Formula (2) to the maximum refractive index at the core center and setting $n_0$ to the refractive index of the cladding doped with $B_2O_3$.

When the predetermined regions are doped with one or more of the multiple kinds of index-control dopants as described above, the GI refractive index profile is obtained as an overall refractive index profile of the MMF of the second embodiment, as shown in FIG. 7C. In the GI refractive index profile of FIG. 7C, the maximum relative refractive index difference $\Delta$ between the core and cladding is constituted of the relative refractive index difference $\Delta_{GE}$ resulting from $GeO_2$ and the relative refractive index difference $\Delta_B$ resulting from $B_2O_3$ ($\Delta=1.0\%=\Delta_{GE}+\Delta_B$) and thus the maximum relative refractive index difference $\Delta$ of 1% is ensured as a whole of the GI refractive index profile.

Figure 8:
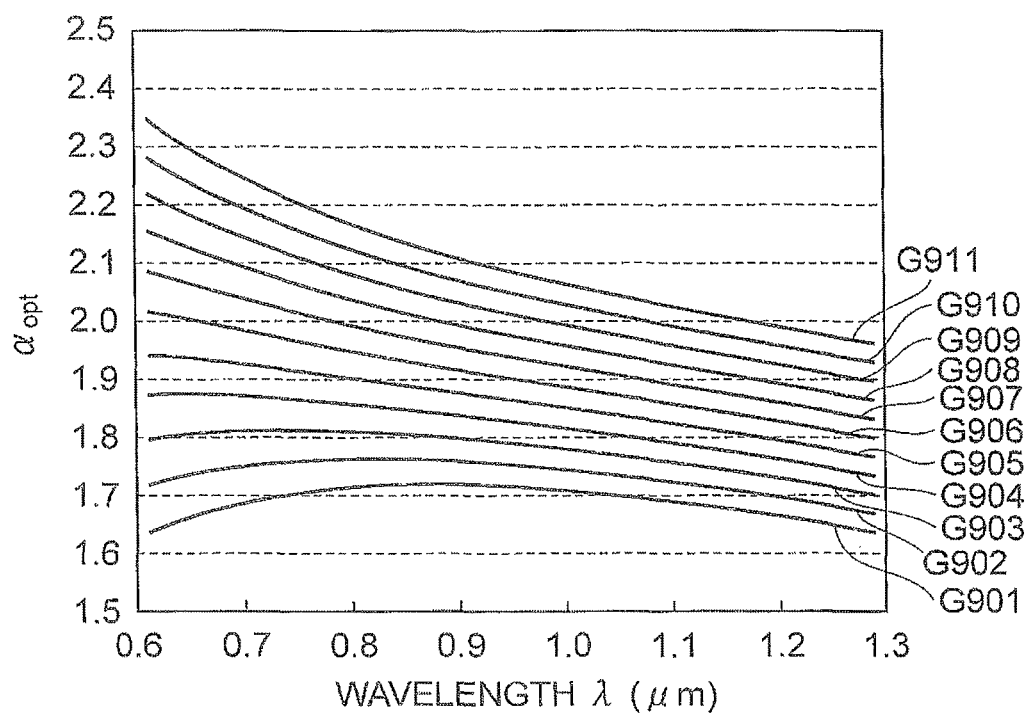
FIG. 8 is graphs showing relationships between $\alpha_{opt}$ to minimize the inter-modal dispersion, among $\alpha$ values defining the shape of GI refractive index profile, and wavelength, for various dopants for control of refractive index added in the core and combinations thereof.

When the core or the like is doped with multiple kinds of index-control dopants as in the above second embodiment, the wavelength dependence of $\Delta_{opt}$ demonstrates significant variation. FIG. 8 is graphs showing relationships between $\Delta_{opt}$ to minimize the inter-modal dispersion, among α values defining the shape of the GI refractive index profile, and wavelength, for various index-control dopants added in the core and combinations thereof. In FIG. 8, graph G901 shows the relationship between $\Delta_{opt}$ and wavelength in the case where the core is doped with only $B_2O_3$ as an index-control dopant ($\Delta=\Delta_B=1.0\%$); graph G902 shows the relationship between $\alpha_{opt}$ and wavelength in the case where the core is doped with $GeO_2$ and $B_2O_3$ as index-control dopants so as to constitute $\Delta$ of $\Delta_{GE}=0.1\%$ and $\Delta_B=0.9\%$; graph G903 shows the relationship between $\alpha_{opt}$ and wavelength in the case where the core is doped with $GeO_2$ and $B_2O_3$ as index-control dopants so as to constitute $\Delta$ of $\Delta_{GE}=0.2\%$ and $\Delta_B=0.8\%$; graph G904 shows the relationship between $\alpha_{opt}$ and wavelength in the case where the core is doped with $GeO_2$ and $B_2O_3$ as index-control dopants so as to constitute $\Delta$ of $\Delta_{GE}=0.3\%$ and $\Delta_B=0.7\%$; graph G905 shows the relationship between $\alpha_{opt}$ and wavelength in the case where the core is doped with $GeO_2$ and $B_2O_3$ as index-control dopants so as to constitute $\Delta$ of $\Delta_{GE}=0.4\%$ and $\Delta_B=0.6\%$; graph G906 shows the relationship between $\alpha_{opt}$ and wavelength in the case where the core is doped with $GeO_2$ and $B_2O_3$ as index-control dopants so as to constitute $\Delta$ of $\Delta_{GE}=0.5\%$ and $\Delta_B=0.5\%$; graph G907 shows the relationship between $\alpha_{opt}$ and wavelength in the case where the core is doped with $GeO_2$ and $B_2O_3$ as index-control dopants so as to constitute $\Delta$ of $\Delta_{GE}=0.6\%$ and $\Delta_B=0.4\%$; graph G908 shows the relationship between $\alpha_{opt}$ and wavelength in the case where the core is doped with $GeO_2$ and $B_2O_3$ as index-control dopants so as to constitute $\Delta$ of $\Delta_{GE}=0.7\%$ and $\Delta_B=0.3\%$; graph G909 shows the relationship between $\alpha_{opt}$ and wavelength in the case where the core is doped with $GeO_2$ and $B_2O_3$ as index-control dopants so as to constitute $\Delta$ of $\Delta_{GE}=0.8\%$ and $\Delta_B=0.2\%$; graph G910 shows the relationship between $\alpha_{opt}$ and wavelength in the case where the core is doped with $GeO_2$ and $B_2O_3$ as index-control dopants so as to constitute $\Delta$ of $\Delta_{GE}=0.9\%$ and $\Delta_B=0.1\%$; graph G911 shows the relationship between $\alpha_{opt}$ and wavelength in the case where the core is doped with only $GeO_2$ as an index-control dopant ($\Delta=\Delta_{GE}=1.0\%$).

It is understood that, by adjusting the number of the kinds of index-control dopants to be added in the core or the like, as described above, it is possible to form a plurality of OFL bandwidth peaks in the wavelength range of 0.85 μm to 1.3 μm (cf. FIG. 8). For this reason, it becomes feasible to ensure a wider OFL bandwidth than that of the conventional MMF (graph G911) throughout the wavelength range of 0.85 μm to 1.3 μm. Specifically, in the wavelength range of 0.85 μm to 1.3 μm, a change amount of $\alpha_{opt}$ is preferably not more than 0.1. In the examples shown in FIGS. 4A to 4D, the OFL bandwidth becomes sharply narrower at wavelengths off the set wavelength of $\alpha_{opt}$. Then, since a plurality of OFL bandwidth peaks can be formed with relaxation of the wavelength dependence of $\alpha_{opt}$ as described above, it also becomes easier to secure the sufficiently wider OFL bandwidth than that of the conventional MMF at the wavelengths off the set wavelength of $\alpha_{opt}$.

When n (≥2) kinds of index-control dopants are used for adjustment of the shape of the refractive index profile of MMF, each of these n kinds of index-control dopants is added in at least either of the core and the cladding. At this time, the maximum relative refractive index difference $\Delta$ is constituted of relative refractive index differences $\Delta_1$, $\Delta_2$, $\Delta_3$, ..., $\Delta_n$ resulting from these n kinds of index-control dopants, as represented by Formula (5) below.

$$\Delta=\Delta_1+\Delta_2+\Delta_3+\ldots+\Delta_n \quad (5)$$

Figure 9A:
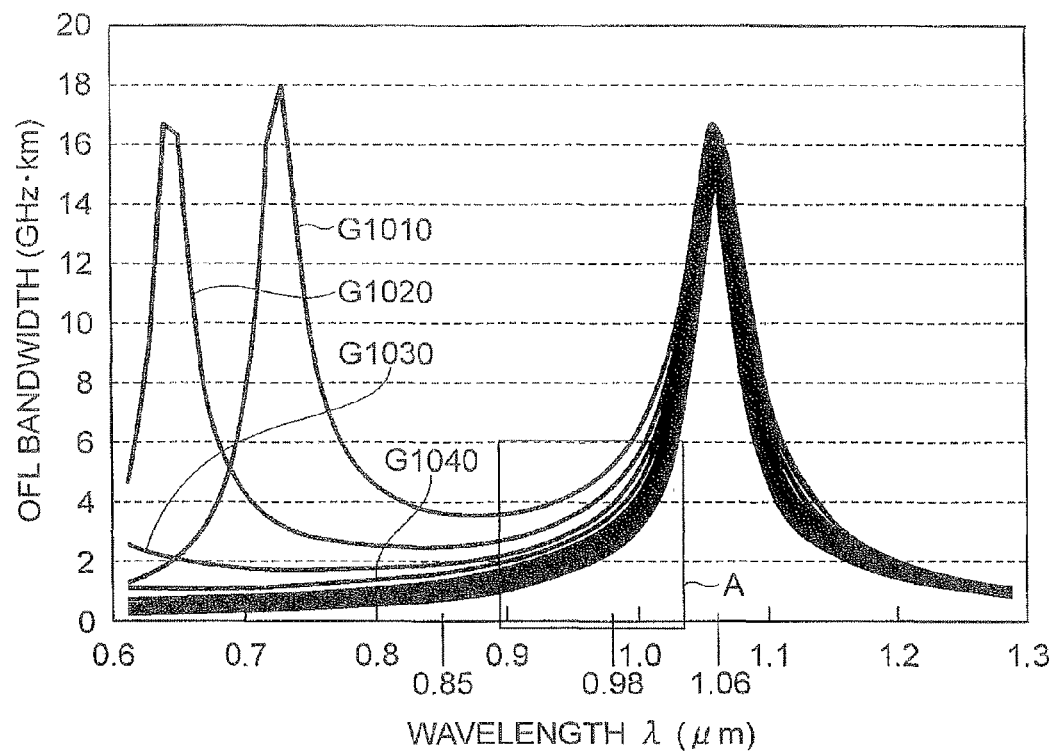
FIG. 9A is a drawing showing wavelength characteristics of OFL bandwidths, at various ratios to constitute a maximum relative refractive index difference $\Delta$ in MMFs, of relative refractive index differences resulting from the dopants for control of refractive index added in the MMFs of the second embodiment, and FIG. 9B an enlarged view of region A shown in FIG. 9A.

Next, for MMFs (GI-MMFs) of the second embodiment, which have the GI refractive index profile shown in FIG. 7C, relationships between constitutive ratios of index-control dopants and wavelength characteristics of OFL bandwidths will be described using FIG. 9A and FIG. 9B. FIG. 9A is a drawing showing wavelength characteristics of OFL bandwidths at various ratios to constitute the maximum relative refractive index difference $\Delta$ in the MMFs, of the relative refractive index differences resulting from the index-control dopants added in the MMFs of the second embodiment, and FIG. 9B an enlarged view of region A shown in FIG. 9A.

Figure 9B:
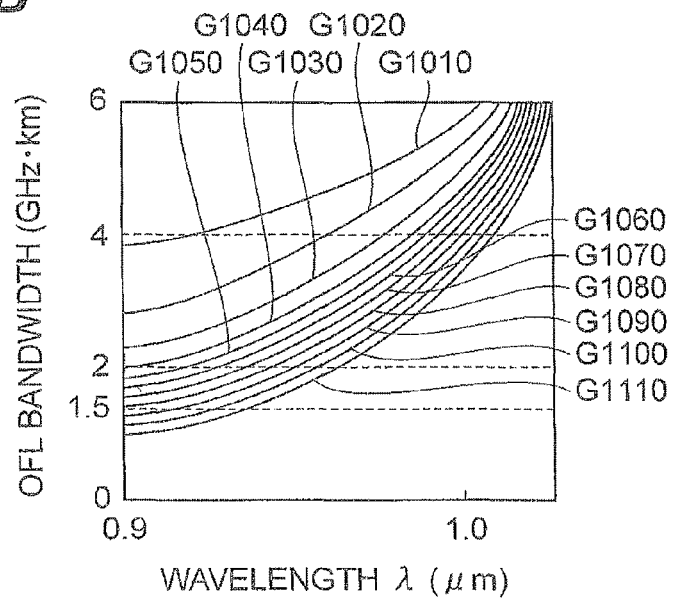

In FIGS. 9A and 9B, graph G1010 shows the wavelength characteristic of the OFL bandwidth in the case where the maximum relative refractive index difference $\Delta$ is constituted of the relative refractive index difference $\Delta_{GE}=0\%$ resulting from $GeO_2$ and the relative refractive index difference $\Delta_B=1\%$ resulting from $B_2O_3$; graph G1020 shows the wavelength characteristic of the OFL bandwidth in the case where $\Delta$ is constituted of $\Delta_{GE}=0.1\%$ and $\Delta_B=0.9\%$; graph G1030 shows the wavelength characteristic of the OFL bandwidth in the case where $\Delta$ is constituted of $\Delta_{GE}=0.2\%$ and $\Delta_B=0.8\%$; graph G1040 shows the wavelength characteristic of the OFL bandwidth in the case where $\Delta$ is constituted of $\Delta_{GE}=0.3\%$ and $\Delta_B=0.7\%$; graph G1050 shows the wavelength characteristic of the OFL bandwidth when $\Delta$ is constituted of $\Delta_{GE}=0.4\%$ and $A_B=0.6\%$; graph G1060 shows the wavelength characteristic of the OFL bandwidth when $\Delta$ is constituted of $\Delta_{GE}=0.5\%$ and $\Delta_B=0.5\%$; graph G1070 shows the wavelength characteristic of the OFL bandwidth in the case where $\Delta$ is constituted of $\Delta_{GE}=0.6\%$ and $\Delta_B=0.4\%$; graph G1080 shows the wavelength characteristic of the OFL bandwidth in the case where $\Delta$ is constituted of $\Delta_{GE}=0.7\%$ and $\Delta_B=0.3\%$; graph G1090 shows the wavelength characteristic of the OFL bandwidth in the case where $\Delta$ is comprised of $\Delta_{GE}=0.8\%$ and $\Delta_B=0.2\%$; graph G1100 shows the wavelength characteristic of the OFL bandwidth in the case where $\Delta$ is constituted of $\Delta_{GE}=0.9\%$ and $\Delta_B=0.1\%$; graph G1010 shows the wavelength characteristic of the OFL bandwidth in the MMF of the comparative example. The examples shown in. FIGS. 9A and 9B show the relationships between OFL bandwidth and wavelength in the MMFs where the α value to define the shape of the GI refractive index profile in the core is adjusted to $\alpha_{opt}$ at the wavelength of 1060 nm. It is seen from FIGS. 9A and 9B that at all wavelengths, the OFL bandwidths of the second embodiment are wider than the OFL bandwidth of graph G1110 as the comparative example. The bandwidth at the wavelength of 0.85 μm becomes wider with increase in $\Delta_B$ and exceeds 1.5 GHz·km when $\Delta_B$ reaches 0.7%. The OFL bandwidth at a wavelength of at least one of 980 nm, 1060 nm, and 1300 nm is wider than the OFL bandwidth at the wavelength of 850 nm. As described above, it is understood that the MMFs of the second embodiment ensure the wide OFL bandwidth in the wider wavelength range than the MMF of the comparative example.

From the above description of the present invention, it will be obvious that the invention may be varied in many ways. Such variations are not to be regarded as a departure from the spirit and scope of the invention, and all improvements as would be obvious to those skilled in the art are intended for inclusion within the scope of the following claims.

What is claimed is:

1. A multimode optical fiber comprising: a core extending along a predetermined axis, the core having a diameter of 25 to 65 μm and a GI refractive index profile whose shape is determined by α value falling within a range of 1.8 to 2.2, the core containing both of a refractive-index increase agent and a first refractive-index decrease agent: and a cladding provided on an outer peripheral surface of the core and containing a second refractive-index decrease agent, a maximum relative refractive index difference between the core and the cladding falling within a range of 0.8 to 2.4%, the maximum relative refractive index difference being constituted of a first relative refractive index difference resulting from the refractive-index increase agent with reference to pure silica and a second relative refractive index difference resulting from each of the first and second refractive-decrease agents with reference to the pure silica, wherein component ratios of the first and second relative refractive index differences are set, while fixing the α value, so as to satisfy both of following first and second conditions while transmission loss in a wavelength range of 850 nm to 1300 nm is not more than 4.0 dB/km:

the first condition being defined as a condition that an OFL bandwidth at a wavelength of 850 nm is not less than 1500 MHz-km and an OFL bandwidth at a wavelength of at least one of 980 nm, 1060 nm, and 1300 nm is not less than 1500 MHz-km; and the second condition being defined as a condition that the OFL bandwidth at the wavelength of at least one of 980 nm, 1060 nm, and 1300 nm is wider than the OFL bandwidth at the wavelength of 850 nm, and wherein the refractive-index increase agent contains any one of $GeO_2$, $P_2O_5$ and Cl, and each of the first and second refractive-index decrease agents contains any one of $B_2O_3$ and F.

2. The multimode optical fiber according to claim 1, wherein the cladding is comprised of silica glass doped with the second refractive-index decrease agent, or, a material other than the silica glass.

3. The multimode optical fiber according to claim 1, having chromatic dispersion falling within the range of −100 to +100 ps/nm/km, in the wavelength range of 850 nm to 1300 nm.

4. The multimode optical fiber according to claim 1, having the transmission loss of not more than 2.4 dB/km, in the wavelength range of 850 nm to 1300 nm.

5. The multimode optical fiber according to claim 1, wherein in a cross section of the multimode optical fiber perpendicular to the predetermined axis, the second relative refractive index difference in the core monotonically decreases along a radial direction from a center of the core, while maintaining the shape of the GI refractive index profile determined by the α value.

6. The multimode optical fiber according to claim 1, wherein the core is doped with $GeO_2$ as the refractive-index increase agent and each of the first and second refractive-index decrease agent is $B_2O_3$, and wherein in a cross section of the multimode optical fiber perpendicular to the predetermined axis, the first relative refractive index difference in the core monotonically decreases along a radial direction from a center of the core, while maintaining the shape of the GI refractive index profile determined by the α value.

7. The multimode optical fiber according to claim 1, wherein the core is doped with $GeO_2$ as the refractive-index increase agent and the first and second refractive index decrease agent is $B_2O_3$, and wherein in a cross section of the multimode optical fiber perpendicular to the predetermined axis, the second relative refractive index difference in the core monotonically decreases along a radial direction from a center of the core, while maintaining the shape of the GI refractive index profile determined by the α value.

* * * * *